Feb. 16, 1971 J. F. SCHERER 3,563,093
THERMO-ACTUATOR DEVICE
Filed May 16, 1969
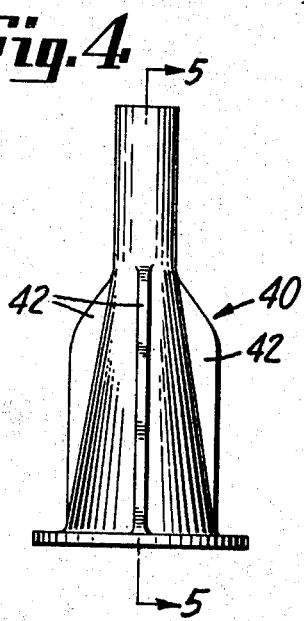
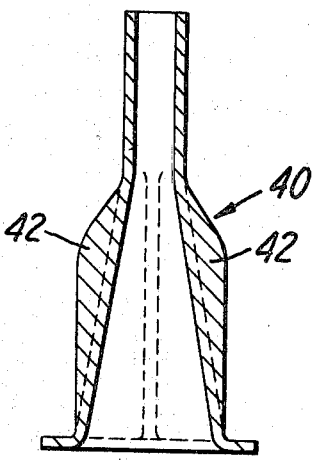
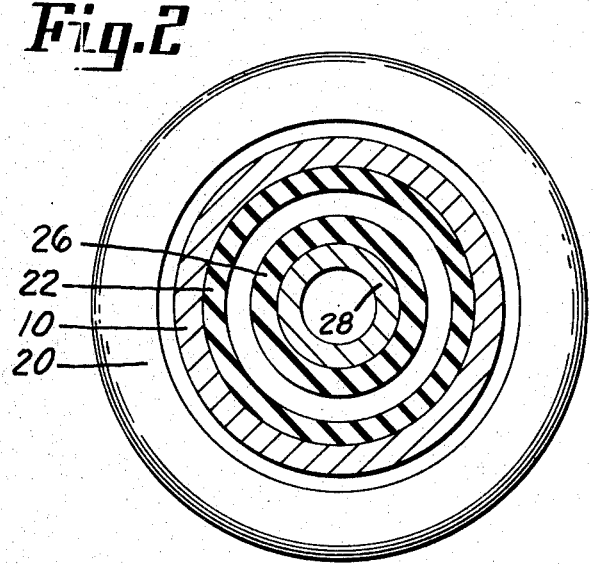
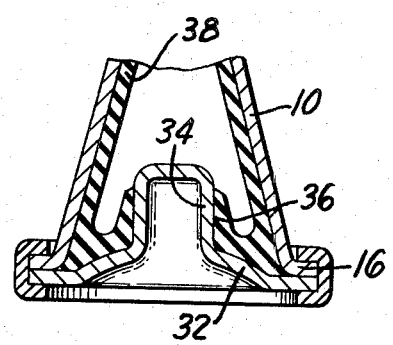
INVENTOR.
JAMES F. SCHERER
BY
*Howard S. Kaiser*
ATTORNEY

3,563,093
THERMO-ACTUATOR DEVICE
James F. Scherer, 2 Waljo Trail, Milford, Ohio 45150
Filed May 16, 1969, Ser. No. 825,239
Int. Cl. G01k 5/34
U.S. Cl. 73—368.3         8 Claims

ABSTRACT OF THE DISCLOSURE

A thermo-actuator device including a housing having a generally frusto-conically shaped chamber formed therein and a hollow, resilient capsule in the chamber having an external shape corresponding to the interior shape of the chamber and being filled with a temperature-responsive material that expands and contracts to an abnormal degree with changes in temperature within a predetermined narrow temperature range. The side walls of the capsule are substantially straight and of uniform thickness from the base to the apex of the capsule so as to produce uniform flexing thereof along the entire length of the capsule when the material therein expands or contracts.

RELATED APPLICATION

Reference is hereby made to United States patent application Ser. No. 825,238 and titled Thermostatically Actuated Radiator Valve, filed on even date herewith.

BACKGROUND AND SUMMARY OF THE INVENTION

The present invention is concerned with thermo-actuator devices which respond to an increase in temperature in a predetermined temperature range to produce a thrust force which is of sufficient magnitude to actuate mechanical devices such as valves, etc. Presently available power actuators depend upon the rapid rise in the temperature versus volume curve exhibited by certain materials in changing from a solid state to a liquid state. Since this change takes place in a narrow temperature range and since different materials change state at different temperatures, it is possible to tailor the actuator to suit the particular use for which it is intended. Thus, for example, an automobile radiator valve intended for use with alcohol-water mixtures in the cooling system is generally designed to operate to open and permit flow through the radiator at 160° F., while a valve intended for use with ethylene glycol-water mixtures is generally designed to operate at 180° F. This can be accomplished by using in each of the valves an actuator of the above type filled with the proper materials to produce the desired action.

The heat-expansible material is conventionally contained within a sealed chamber and acts through a flexible diaphragm or capsule to transmit pressure to a plunger which is thereby expelled from the actuator housing with considerable force. The high pressures involved provide difficult sealing problems and also impose severe strains on the flexible material of the diaphragm or capsule. If the strain is concentrated in a particular area, the diaphragm will be likely to rupture at that point after repeated cycling of the actuator. When this occurs, the heat-expansible material, upon changing to a liquid, leaks out around the plunger and the actuator is no longer serviceable and must be replaced.

Another problem with actuators of the change-of-state type is that during the contraction portion of the cycle when the material is returning to its solid state, the material adjacent to the walls of the chamber cools first and forms an insulating layer or barrier which obstructs the cooling of the material in the center of the chamber. This increases the lag of the device in responding to changes in temperature of the surrounding medium.

Accordingly, it is an object of the present invention to provide a thermo-actuator device of the type herein before described which has a longer useful life, this being accomplished through a novel design of the actuator which results in a more even distribution of stresses on the resilient material of the capsule.

Another object of the invention is to provide a change-of-state type thermo-actuator in which the formation of a barrier layer of the solid material along the walls of the chamber is prevented by reason of the flexing of the wall along the entire length of the capsule thereby disrupting the incipient layer of solid heat-expansible material before it can build up along the wall.

Another object of the invention is to provide a temperature-responsive thermo-actuator with heat transfer fins on the external surface of the housing so as to afford a more rapid response of the unit to changes in the temperature of the surrounding medium.

DESCRIPTION OF INVENTION

In the drawings:

FIG. 1 is a cross-sectional elevation taken through the longitudinal axis of the thermo-actuator device.

FIG. 2 is a cross-sectional view taken along the line 2—2 in FIG. 1.

FIG. 3 is a cross-sectional view showing a detail of a modified form of the thermo-actuator device.

FIG. 4 is a side elevation showing a modified form of the housing of the thermo-actuator shown in FIG. 1.

FIG. 5 is a cross-sectional view taken along the line 5—5 in FIG. 4.

In the preferred embodiment of the invention as shown in the accompanying figures the thermo-actuator device of the present invention is formed of a two-piece housing made up of a casing 10 and a bottom closure or base 18. The casing 10 is preferably circular in cross-section and takes the form of a frustum of a cone tapering from a broad base at the lower end to a narrow neck at the upper end which merges into a cylindrical portion 12 in which is slidably received a plunger 14. The lower end of the casing is provided with a flange 16 to which the bottom cap or base 18 is secured by means of a rolled-over lip 20.

Within the frusto-conical chamber thus formed by the casing 10 and the base 18 is a capsule 22 formed of a resilient material such as rubber. The capsule is formed at its upper end with a thickened portion or plug 24 which lies beneath the plunger 14 and exerts pressure thereagainst when the material within the capsule expands due to an increase in temperature. The bottom of the capsule is provided with an in-turned sealing flap 26 which engages snugly about the substantially cylindrical side walls of a protrusion 28 formed integrally with the base 18. The seal provided by the flap 26 engaging with the protrusion 28 prevents the material within the capsule from being forced out under the high pressures developed within the chamber of the device during use of the actuator.

The interior of the capsule is completely filled with a heat-expansible material 30 which may comprise any suitable substance which undergoes a relatively large change in volume over a selected temperature range. Examples of usable materials for this purpose are disclosed in U.S. Pat. No. 2,259,846 issued to Vernet et al. As indicated therein, heat-expansible materials are comprised generally of microcrystalline waxes or blends thereof which are formulated to achieve the desired volume change at any particular temperature level. The rapid change in volume of such materials occurs at the point at which the material changes from a solid state to a liquid state and vice versa. It will be observed that by making the housing in the frusto-conical form shown in the drawings, the capsule 22 is thereby provided with a long side wall which is of substantially uniform wall thickness throughout its length from the base of the cone to the apex thereof. By thus providing a capsule with straight side walls which are moderately inclined to the longitudinal axis of the capsule, uniform flexing of the capsule material is thereby achieved along the entire length of the walls during the change in volume of the material 30 within the capsule. Hence, there are no areas of stress concentration and the capsule is permitted to expand and contract freely with uniform slippage along the entire length of the interior housing wall. Also, during cooling of the material 30 any layer of recrystallized wax forming along the interior wall of the capsule is broken up by the shrinkage of the wall.

For best results, the sidewalls of the casing 10 should have a moderately low angle of inclination with respect to the longitudinal axis thereof so as to insure free slippage of the sidewalls of the capsule along the interior surface of the casing 10 during expansion or contraction of the material 30. In the example shown herein, the angle of inclination is 15 degrees although other angles are usable. In fact this angle, depending on the material of the casing and the composition of the capsule, may even approach 45 degrees, though it should not equal or exceed this amount.

Instead of the flat base 18 shown in FIG. 1, a concave configuration such as shown in FIG. 3 may be used in order to provide greater strength and thus better resist the extremely high pressures which are developed within the capsule when the load on the plunger 14 is of considerable magnitude. Thus, the base 32 shown in FIG. 3 is shaped as a portion of the sphere and is provided in its center with a protrusion 34 against which a sealing flap 36 of a resilient capsule 38 is snugly received. Thus, the modified form of capsule 38 shown in FIG. 3, which is shaped to conform to the concave base 32, again provides a tight seal against the protrusion 34 and prevents the egress of the heat-expansible material from the interior of the capsule under the influence of the high pressures developed within the housing during operation of the device.

In FIGS. 4 and 5 of the drawings is shown a modified form of casing 40 which may be identical with the casing 10 with the exception of a plurality of heat transfer fins 42 formed integrally therewith. These fins not only provide for a more rapid transfer of heat between the housing and the surrounding medium, but also reinforce and strengthen the side walls of the same, which, as previously mentioned, may be subjected to extremely high internal pressures when the loading on the operating plunger of the device is high.

The material of the casing 10, or the modified form of casing 40, may be of any suitable material such as a copper alloy or brass which has customarily been used for this purpose in the past. It may also advantageously be composed of a nickel-chrome alloy such as stainless steel, which although not as good a conductor of heat as the copper alloys, provides a more satisfactory interface with the rubber capsule 22. Since chromium possesses the quality of acting as a lubricant for rubber, a housing composed of a chromium alloy prevents any tendency of the rubber to adhere to the interior walls of the housing under pressure and results in longer capsule life.

Having thus described my invention, what I claim as new and desire to secure by Letters Patent is:

1. A thermo-actuator device comprising a metal housing having a straight-walled frusto-conical chamber therein, a frusto-conical resilient capsule in said chamber having side walls of a configuration corresponding to the side walls of the chamber, a substantially frusto-conical enclosure within said capsule, the side walls of said capsule being of substantially uniform thickness from the base of the capsule to the apex thereof, and a temperature-sensitive material completely filling the enclosure in said capsule.

2. The thermo-actuator device of claim 1 wherein the angle of inclination of the side walls of the capsule with respect to the longitudinal axis thereof is less than 45 degrees.

3. The thermo-actuator device of claim 1 wherein the angle of inclination of the side walls of the capsule with respect to the longitudinal axis thereof is approximately 15 degrees.

4. The thermo-actuator device of claim 1 wherein the material of said housing is a nickel-chrome alloy.

5. The thermo-actuator device of claim 1 wherein said housing is provided with integrally formed fins on the exterior surface thereof to facilitate the transmission of heat to and from the metal of the housing.

6. A hollow capsule formed of resilient material for use in a thermo-actuator device, said capsule being of a substantially straight-walled frusto-conical shape with side walls of substantially uniform thickness from the base of the capsule to the apex thereof where said side walls terminate in a solid frusto-conical plug portion, the angle of inclination of the side walls of the capsule with respect to the longitudinal axis thereof being less than 45 degrees.

7. The capsule of claim 6 wherein the angle of inclination of the side walls of the capsule with respect to the longitudinal axis thereof is approximately 15 degrees.

8. A thermo-actuator device comprising a housing having a straight-walled frusto-conical chamber therein and a cylindrical portion adjoining said chamber at the smaller end thereof, said cylindrical portion being provided with a bore of uniform cross-section communicating with said chamber and being disposed in coaxially extending relationship thereto, a piston slidably received in said bore, a resilient capsule in said chamber having side walls of a configuration corresponding to the side walls of the chamber and having a thickened portion at its smaller end adapted for engagement with said piston, a substantially straight-walled frusto-conical enclosure within said capsule, the side walls of said capsule being of substantially uniform thickness from the base of the capsule to the apex thereof, a base cap on said housing forming a bottom closure for said frusto-conical chamber and serving to confine said capsule within said housing between said piston and said base cap, and a temperature-sensitive material completely filling the enclosure in said capsule.

References Cited

UNITED STATES PATENTS

| | | | |
|---|---|---|---|
| 2,736,604 | 2/1956 | Albright | 236—100UX |
| 2,803,494 | 8/1957 | Scherer | 73—368.3 |
| 2,835,634 | 5/1958 | Vernet | 73—368.3X |
| 3,442,078 | 5/1969 | Nolan | 73—368.3X |

LOUIS R. PRINCE, Primary Examiner

W. A. HENRY II, Assistant Examiner

U.S. Cl. X.R.

236—100